United States Patent
Jayam et al.

(10) Patent No.: US 7,293,100 B2
(45) Date of Patent: Nov. 6, 2007

(54) METHODS AND APPARATUS FOR PARTIALLY REORDERING DATA PACKETS

(75) Inventors: Ramkumar Jayam, San Jose, CA (US); Anil Kapatkar, San Jose, CA (US); Sivakumar Munnangi, Santa Clara, CA (US); Srinivasan Venkataraman, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 705 days.

(21) Appl. No.: 10/233,304

(22) Filed: Aug. 30, 2002

(65) Prior Publication Data

US 2003/0108045 A1    Jun. 12, 2003

Related U.S. Application Data

(60) Provisional application No. 60/316,651, filed on Aug. 31, 2001.

(51) Int. Cl.
*G06F 13/00* (2006.01)
*H04L 12/28* (2006.01)

(52) U.S. Cl. .............. 709/230; 709/200; 709/227; 709/228; 709/237; 370/218; 370/412

(58) Field of Classification Search ........... 709/227, 709/228, 230, 231, 234, 237, 200; 370/412, 370/218; 710/62
See application file for complete search history.

(56) References Cited

U.S. PATENT DOCUMENTS

| 4,807,224 | A | * | 2/1989 | Naron et al. ............ 370/218 |
|---|---|---|---|---|
| 5,337,313 | A | * | 8/1994 | Buchholz et al. ........ 370/394 |
| 5,367,643 | A | * | 11/1994 | Chang et al. ............ 710/62 |
| 5,600,793 | A | | 2/1997 | Nord |
| 5,648,970 | A | * | 7/1997 | Kapoor .................... 370/394 |
| 5,678,008 | A | | 10/1997 | Hin |
| 6,246,684 | B1 | * | 6/2001 | Chapman et al. ........ 370/394 |
| 6,351,454 | B1 | * | 2/2002 | Crocker et al. .......... 370/235 |
| 6,393,023 | B1 | | 5/2002 | Shimizu et al. |
| 6,438,604 | B1 | * | 8/2002 | Kuver et al. ............. 709/234 |
| 6,457,121 | B1 | * | 9/2002 | Koker et al. ............. 712/300 |
| 6,493,342 | B1 | * | 12/2002 | Breslow et al. .......... 370/394 |

(Continued)

OTHER PUBLICATIONS

International Preliminary Examination Report dated May 8, 2003, PCT/US02-27707.

(Continued)

*Primary Examiner*—David Wiley
*Assistant Examiner*—Alina N. Boutah
(74) *Attorney, Agent, or Firm*—IP Strategy Group, P.C.

(57) ABSTRACT

A method in a target device for partially reordering a plurality of data packets transmitted from a source device. The source device is coupled to the target device via a computer network. The method receiving a first set of data packets from the transmitted device, and ascertaining whether the first set of data packets represents a set of data packets that the target device expects to receive next. If the first set of data packets does not represents the set of data packets that the target expects to receive next, the method includes storing the first set of data packets in a memory buffer of the target device. The storing includes arranging the first set of data packets in the memory buffer such that data packets in the memory buffer, including the first set of data packets, are in order in the memory buffer.

10 Claims, 6 Drawing Sheets

U.S. PATENT DOCUMENTS

| | | | |
|---|---|---|---|
| 6,735,203 B1 * | 5/2004 | Heiman ...................... | 370/394 |
| 6,751,238 B1 * | 6/2004 | Lipp et al. .................. | 370/541 |
| 6,781,992 B1 * | 8/2004 | Rana et al. ................. | 370/394 |
| 6,832,261 B1 * | 12/2004 | Westbrook et al. ......... | 709/236 |
| 7,050,437 B2 * | 5/2006 | Bilic et al. .................. | 370/394 |
| 7,092,393 B1 * | 8/2006 | Westbrook et al. ......... | 370/394 |
| 7,123,618 B2 * | 10/2006 | Ido et al. .................... | 370/394 |
| 7,170,856 B1 * | 1/2007 | Ho et al. .................... | 370/230 |
| 7,180,896 B1 * | 2/2007 | Okumura .................... | 370/394 |
| 7,209,437 B1 * | 4/2007 | Hodgkinson et al. ....... | 370/230 |
| 2001/0023445 A1 * | 9/2001 | Sundqvist .................. | 709/228 |
| 2002/0031125 A1 * | 3/2002 | Sato ........................... | 370/394 |

OTHER PUBLICATIONS

International Search Report in International Application No. PCT/US02/27709 mailed Nov. 5, 2002 (5 pages).

International Search Report in International Application No. PCT/US02/277097 mailed Dec. 18, 2002 (4 pages).

* cited by examiner

METHODS AND APPARATUS FOR PARTIALLY REORDERING DATA PACKETS

This application claims priority under 35 USC 119(e) of the following patent application(s), which is incorporated by reference herein
METHOD OF IMPLEMENTING TRANSMISSION CONTROL PROTOCOL/INTERNET PROTOCOL IN HARDWARE (A/N 60/316,651, filed Aug. 31, 2001).

This application incorporates by reference the following patent applications:
1 SYSTEMS AND METHODS FOR HIGH SPEED DATA TRANSMISSION USING TCP/IP Ser. No. 10/233,302, filed on even date herewith.
2 APPARATUS AND METHODS FOR TRANSMITTING DATA AT HIGH SPEED USING TCP/IP Ser. No. 10/232,819, filed on even date herewith.
3 APPARATUS AND METHODS FOR RECEIVING DATA AT HIGH SPEED USING TCP/IP Ser. No. 10/232,821, filed on even date herewith.
4 SYSTEMS AND METHODS FOR IMPLEMENTING HOST-BASED SECURITY IN A COMPUTER NETWORK Ser. No. 10/233,303, filed on even date herewith.

BACKGROUND OF THE INVENTION

The present invention relates in general to networking technologies and in particular to methods and apparatus for optimizing the transfer of data packets across a work.

Data traffic on the Internet continues to grow at phenomenal rates. Initially designed as low-bandwidth text medium, Internet traffic is now including greater amounts of high-bandwidth traffic, such as pictures, audio & video streaming, video conferencing, and online gaming.

The primary protocol suite of the Internet is TCP/IP, or Transmission Control Protocol/Internet Protocol. TCP/IP is actually two separate protocols that work together, a higher level protocol called Transmission Control Protocol, and a lower level protocol called Internet Protocol. TCP manages the segmentation of a message, file, or data stream (generically "file") into smaller packets, or segments, that are transmitted across the network from a source device to one or more target devices. When the packets arrive at their destination, packets that are in-order are reassembled with previously received packets, and an acknowledgement is sent back to the source device. IP, on the other hand, handles the address part of each packet so that it arrives at the proper target device.

For example, an application on a source device, such as a web server, may use TCP/IP to transmit information to an application on a target device, such as a web browser. However, since the Internet is connectionless, there is no guaranteed predetermined path from one device on the network to another. There is, therefore, a very high probability that some packets from the same session will be routed differently than others, arriving at their destination in a different order from the order with which they were initially transmitted.

During the initial setup process, prior to the actual transmission of data, TCP/IP adjusts the size of the transmitted packet according to network conditions between the source and target device. If the packet is too small, the network will be unnecessarily congested, and the data will arrive at its destination needlessly late. If the packet size is too large, it will not arrive at its destination at all, and no acknowledgements will be sent back to the source device. If no acknowledgement is received for some time, TCP/IP may reduce the size of the packet and the number of packets sent until acknowledgements are received. Once acknowledgements are received, TCP/IP will begin to increase the packet size and number of packets again to attempt to optimize the data transfer.

In order to account for the variability of packet size, TCP/IP mandates that each packet contain a sequence number and a length. The sequence number is used to order the packets. Generally speaking, the sequence number of the packet corresponds to the order number of the first data byte in the packet within the total transmitted file. For instance, if a file of 2000 bytes were transmitted, and the $2^{nd}$ packet transmitted has a sequence number of 1000, then 999 bytes have already been sent target device in the first packet.

The length is used to determine the sequence number of the next packet. For instance, if a file of 2000 bytes were transmitted, and the $2^{nd}$ packet transmitted has a sequence number of 1000, and a length of 500, then the sequence number of the next packet is 1500.

In general, since applications can only assemble and interpret data in the correct sequential order, the target device only forwards to a target application the next expected sequential packet, along with other sequentially contiguous packets located in the memory buffer of the target device.

Figure 1A:
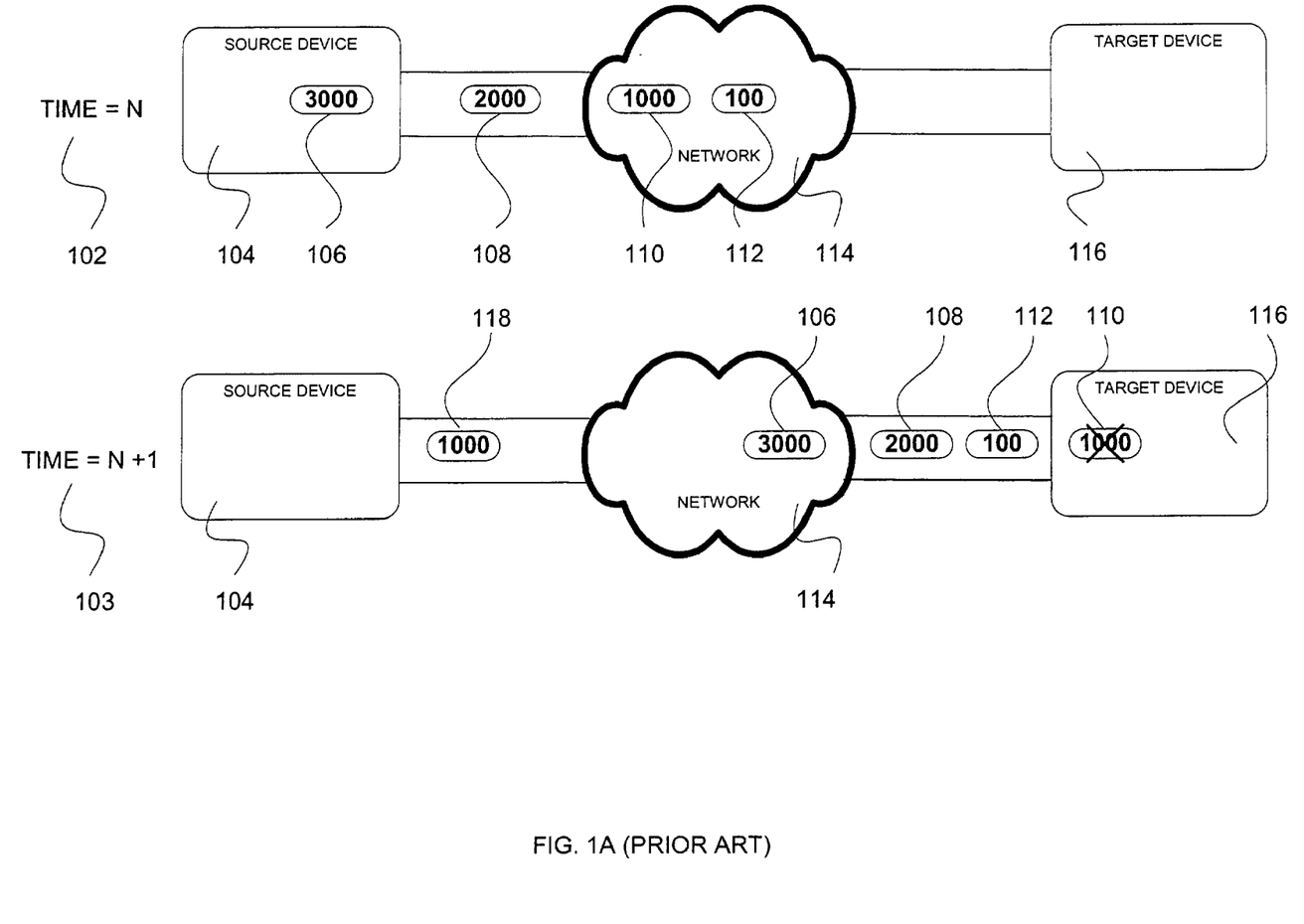
FIG. 1A shows, in accordance with a prior art technique, a simplified diagram showing how a source device can transmit a group of sequenced packets to a target device across a network.

FIG. 1A shows, in accordance with a prior art technique, a simplified diagram showing a source device 104 transmitting a group of sequenced packets to a target device 116 across a network. In the example of FIG. 1A, target device 116 does not have a memory buffer for any incoming packets. Received packets whose sequence numbers are out of order are simply discarded. The source device 104 simply retransmits the discarded packets to the target device 116, if acknowledgements are not received after a certain period of time.

At time=N (102), source device 104 transmits packet 100 (112), packet 1000 (110), packet 2000 (108), and packet 3000 (106) in sequence, to target device 116, across network 114. Packet 100 (112), with the smallest sequence number that has not been received, is the next expected packet at target device 116.

At a later time=N+1 103, packet 1000 (110) reaches target device 116 prior to the packet 100 (112). Target device 116, having no data buffering mechanism, simply discards packet 1000 (110), and waits for packet 100 (112), which in this example is arriving next. Source device 104, receiving no acknowledgement after a certain period of time from target device 116, simply retransmits packet 1000 (110).

Although relatively easy to implement, this method is problematic because it needlessly floods the network with retransmitted data packets. Not only will the network appear sluggish to the target application, since it must wait an additional amount of time to receive correctly sequenced packets, but the additional traffic will also reduce the overall performance of the network for all other connected devices by increasing congestion.

Figure 1B:
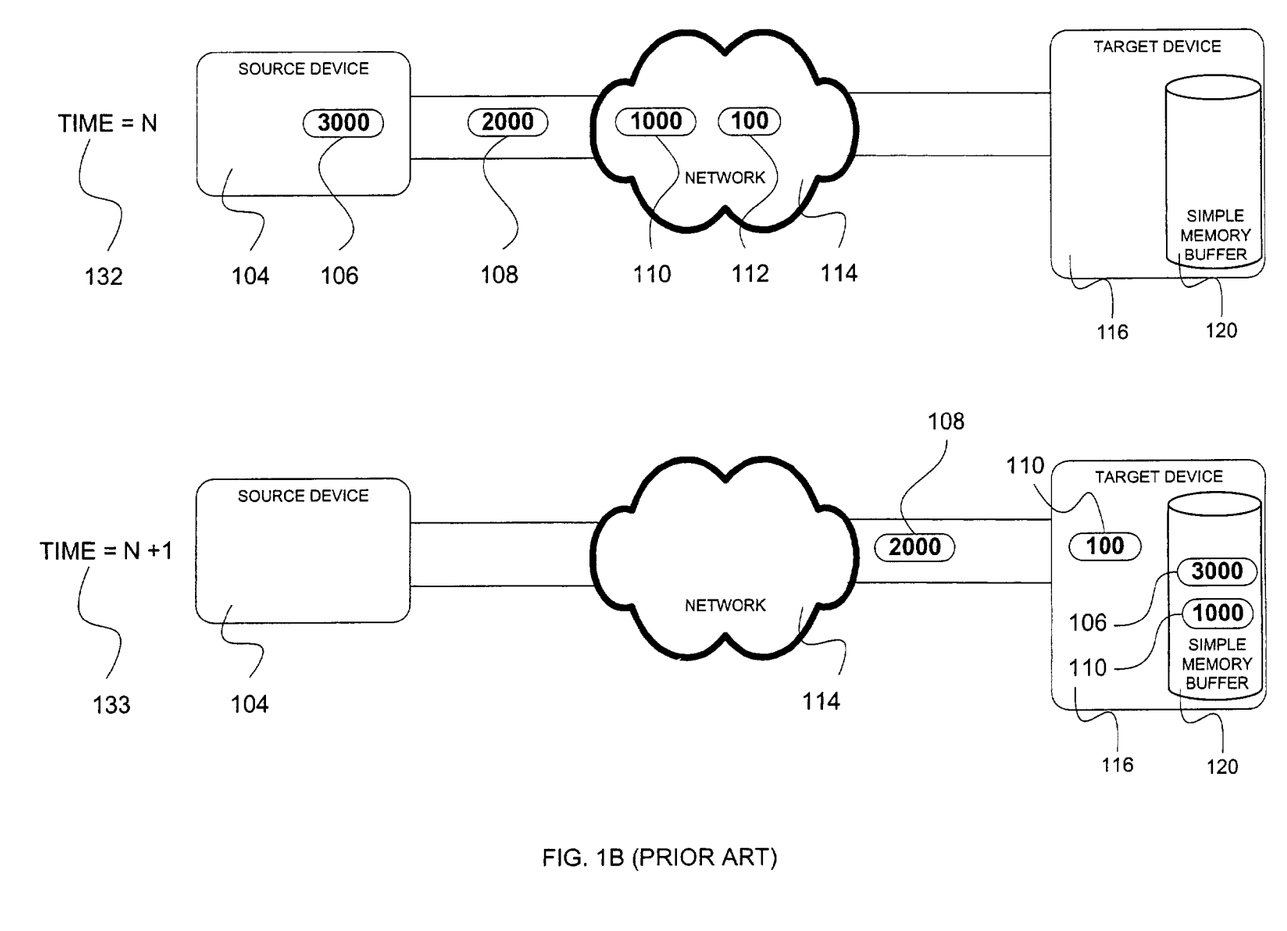
FIG. 1B shows, in accordance with another prior art technique, a simplified diagram showing how a source device can transmit a group of sequenced packets to a target device across a network.

Referring now to FIG. 1B, another prior art technique is shown in which the target device 116 contains a memory buffer 120. It is simple in the sense that packets are stored in vacant locations in no particularly order. Once the memory buffer 120 is full, any additional packets, other than the next expected packet, are discarded. The next expected packet is forwarded to the target application once it arrives at the target device, or once it is located in the memory buffer 120. A new next expected packet is then determined.

At time=N (132), source device 104 transmits packet 100 (112), packet 1000 (110), packet 2000 (108), and packet 3000 (106) in proper sequence, to target device 116, across network 114. Packet 100 (112) is the next expected packet at target device 116.

At a later time=N+1 133, packet 1000 (110) and packet 3000 (106) reach target device 116 prior to the packet 100 (112). Target device 116, having a memory buffer 120, places packet 1000 (110) in the first available slot, and packet 3000 (106) in the next available slot, and waits for packet 100 (112), which in the example of FIG. 1B is arriving next.

Once packet 100 (112) arrives, it is forwarded to the target application on the target device 116, and a new next expected packet is determined. The target device 116 then scans the entries in the memory buffer 120 for the new next expected packet. If it is located, it too is forwarded to the software application. In this diagram, packet 1000 (110) is the new next expected packet, and has already arrived at the memory buffer 120. The target device 116 would locate and forward packet 1000 (110) to the software application.

Although the use of a memory buffer 120 is an improvement over the implementation of FIG. 1A, there are still disadvantages. The memory buffer 120 still transfers packets in an inefficient manner to the application, since the sequence number of each packet must be continuously re-inspected in the buffer when a new packet arrives at the target device. This re-inspection increases the network latency for the application by slowing the transfer rate of data packets.

In view of the foregoing, it is desirable to come up with methods and apparatus for optimizing the transfer of data packets across a network, in order to improve application performance and reduce unnecessary network congestion.

SUMMARY OF THE INVENTION

The invention relates, in one embodiment, to a method in a target device for partially reordering a plurality of data packets transmitted from a source device. The source device is coupled to the target device via a computer network. The method receiving a first set of data packets from the transmitted device, and ascertaining whether the first set of data packets represents a set of data packets that the target device expects to receive next. If the first set of data packets does not represents the set of data packets that the target expects to receive next, the method includes storing the first set of data packets in a memory buffer of the target device. The storing includes arranging the first set of data packets in the memory buffer such that data packets in the memory buffer, including the first set of data packets, are in order in the memory buffer.

In another embodiment, the present invention relates to memory buffer structure and associated logic in a target device for partially ordering packets received at the target device from a source device. Out-of-order packets received at the target device are stored in the memory buffer structure in order by their sequence numbers, along with packets already in the memory buffer, if any. If a plurality of packets in the memory buffer are in order, the plurality of packets that are in order are sent to the application in the target device. The memory buffer may contain pointers that point to memory locations for storing the partially-ordered data packets, in one embodiment.

In yet another embodiment, the invention includes a look-ahead capability to reduce the unnecessary reordering of ROB pointers and to improve efficiency. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Figure 2:
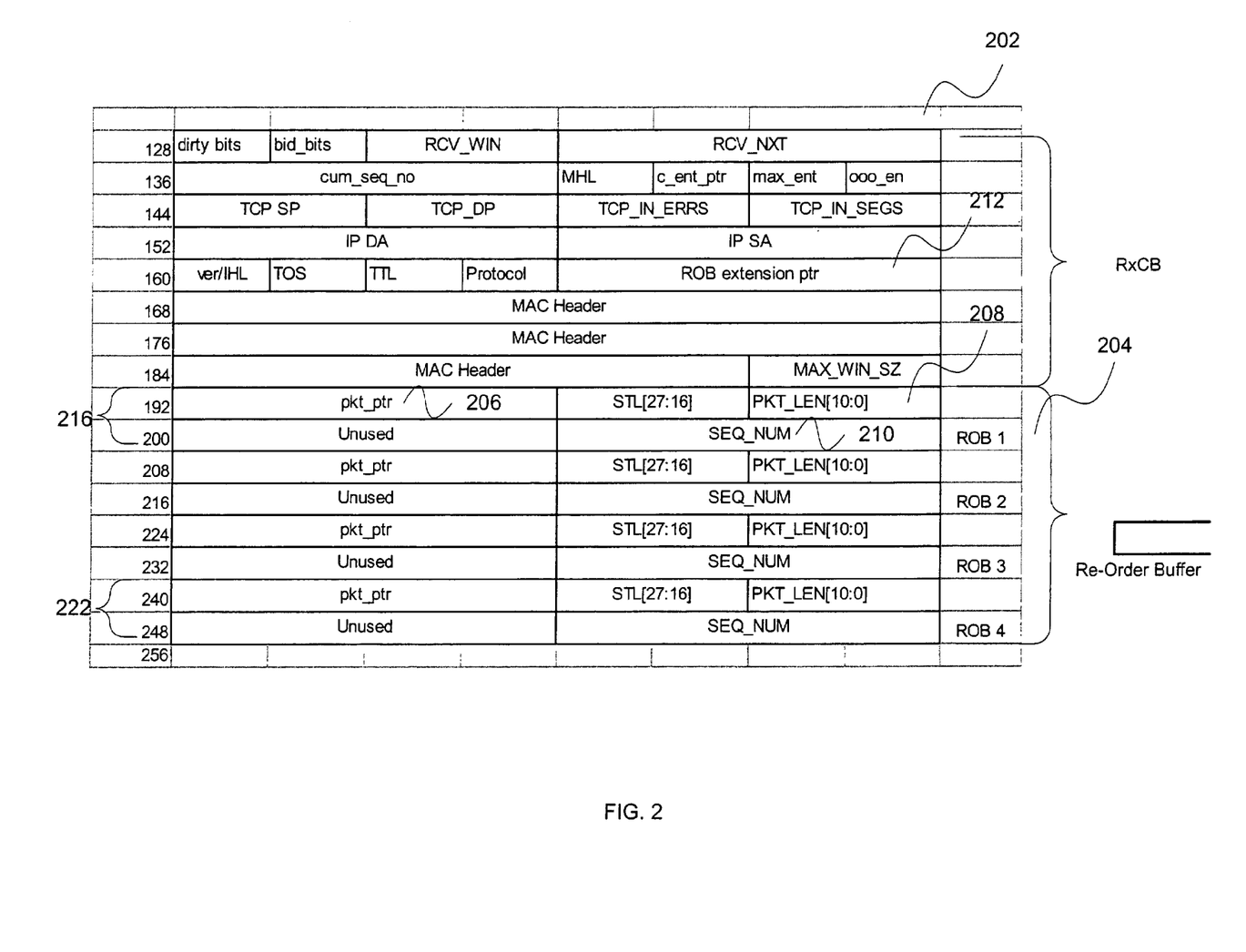
FIG. 2 illustrates, in accordance with one embodiment of the present invention, a receive transmit control block (Rx TCB) data structure for facilitating receiving data at the target device.

The features and advantages of the present invention may be better understood with reference to the drawings and discussions that follow. FIG. 2 illustrates, in accordance with one embodiment of the present invention, a receive transmit control block (Rx TCB) 202 data structure for facilitating receiving data at the target device. Together with the transmit TCB (Tx TCB), Rx TCB 202 facilitates the receive process at a target device by managing various aspects of the data transfer, such as the numbers of packets that are in transit at any given time, also called window management, and also by managing packet queuing and timing.

Incoming packets, themselves, are not directly kept in the re-order buffer (ROB) 204 of the Rx TCB 202. Since packets can be of varying size, it may be more efficient to store ROB pointers ("pkt_ptrs") 206 to the packets in the ROB 204, and actually store some or all the packets themselves in an external memory location. Along with each pointer 206, the packet length ("PKT_LEN[10:0]") 208 and the sequence number ("SEQ_NUM") 210 are stored. Of course the size of the packet length 208 may be varied according to implementations.

The Rx TCB 202 also contains a ROB extension pointer ("ROB extension ptr") 212 for packet overflow. That is, arriving packets whose ROB pointers 206 cannot fit in the ROB 204 are themselves stored in a memory location that is referenced by the ROB extension pointer 212. It is, in essence, a pointer to a location that contains other pointers, which can in turn reference packets.

The Rx TCB stores ROB pointers in its ROB 204 in sequence number order. For example, the ROB pointer with the smallest sequence number is stored at the top 216 of the ROB 204, and the ROB pointer with the largest sequence number is stored at the bottom 222 of the ROB 204, or is referenced in a memory location by the ROB extension pointer 212. ROB pointers in this memory location may also be stored by sequence number. As new packets arrive, the ROB is reordered as necessary to insure that the ROB pointers are kept in order by sequence number. Also, packets may be discarded when their ROB pointers can no longer fit into the ROB 204, or with the ROB extension pointer 212, after readjustment.

Figure 3:
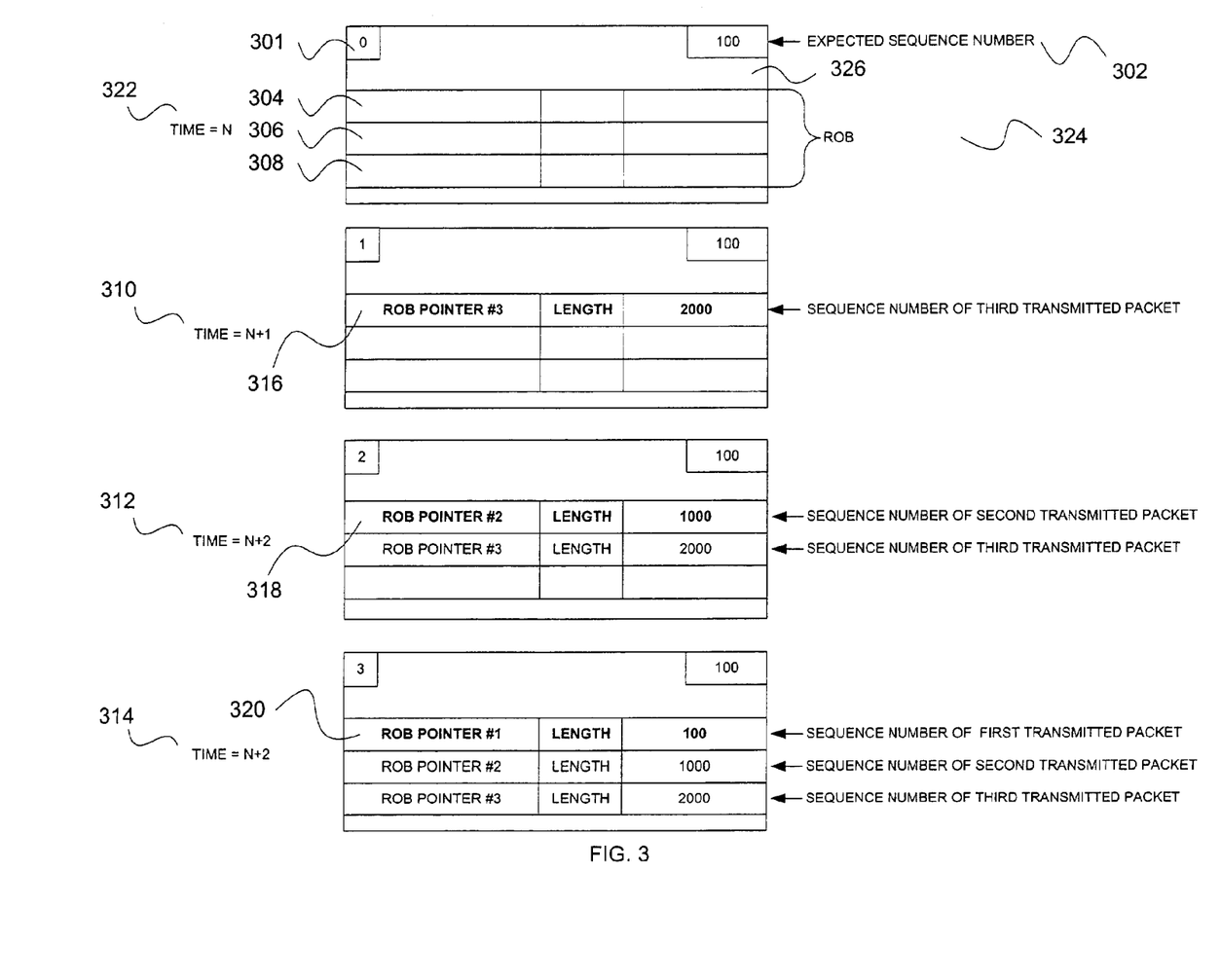
FIG. 3 illustrates, in accordance with one embodiment of the present invention, a simplified diagram showing a Rx TCB whose out-of-order packets are partially reordered.

FIG. 3 illustrates, in accordance with one aspect of the present invention, a simplified diagram showing an Rx TCB whose out-of-order packets are partially reordered. The reordering is only partial since reordering is undertaken even if all of the packets being reordered are not sequentially numbered. For example, reordering packets occurs in the buffer even though their numbers are not contiguous. The TCB in the example of FIG. 3 contains three slots in the ROB 324 for each of three ordered entries, a first entry 304, and second entry 306, and a third entry 308. Of course the number of slots can be varied as desired. Each entry may include a pointer to the received packet stored in the ROB, the length of the packet, and the sequence number of the packet. The TCB may also contain a counter 301 that keeps track of the number of out-of-order packets that have arrived at the target device.

Once the packet with the expected sequence number 302 arrives at the target device, the Rx TCB forwards it, along with all sequentially contiguous packets found in the ROB, to the application. The TCB determines the last sequentially contiguous entry in the memory buffer 324 by subtracting the out-of-order counter 301 from the total amount of packets received and stored.

Suppose three packets are transmitted from the source device to the target device. The first transmitted packet has a sequence number of 100, the second transmitted packet has a sequence number of 1000, and the third transmitted packet has a sequence number of 2000.

The packets arrive, however, out of order. The first packet received is the third transmitted packet with a sequence number of 2000. The second packet received is still the second transmitted packet with a sequence number of 1000. And the third packet received is the first transmitted packet with a sequence number of 100.

Initially, at time=N (322), prior to the arrival of any packets, the ROB 324 is empty. The expected sequence number 302 is 100 which is also the sequence number of the first packet to be sent from the source device, since the TCP/IP data transfer has not yet started.

At time=N+1 (310), the third transmitted packet arrives with sequence number 2000. Since this does not match the expected sequence number 302 of "100", the third transmitted packet is placed in memory, and a ROB pointer 316 is stored in the ROB 324 at the first entry 304, along with its length and sequence number. The out-of-order counter 301 changed to "1". That is, there is one entry, and it is not in proper order.

At time=N+2 (312), the second transmitted packet has arrived with sequence number 1000. Since this also does not match the expected sequence number 100, the second transmitted packet is placed in the memory, and a ROB pointer 318 is stored in the ROB 324, along with its length and the sequence number. Since the second transmitted packet has a sequence number smaller than the previously arrived third transmitted packet, the ROB pointer entries in the ROB 324 are reordered. The ROB pointer to the second transmitted packet is placed in the first entry 304, while the ROB pointer to the third transmitted packet is moved to the second entry 306. The out-of-order counter 301 is now changed to "2". That is, there are two entries, and they are both out of order, albeit partially reordered in ROB 324.

At time=N+3 (314), the first transmitted packet finally arrives, with sequence number that matches the expected sequence number 302 of "100". At this point, the TCB places the first transmitted packet in memory, stores a ROB pointer 320 in the ROB 324 at the first entry 306, along with its length and the sequence number. And again, the ROB 324 is reordered. The ROB pointer to the second transmitted packet is moved to the second entry 306, and the ROB pointer to the third transmitted packet is moved again to the third entry 308. The out-of-order counter 301 is now "0", since there are three entries, but all are corrected ordered.

The TCB then forwards all three properly ordered packets by sequence number to the application on the target device, clears the ROB, and subsequently determines the next expected sequence number 302.

In the context of the present invention, providing a ROB for arrived packets reduces the need to flood the network with retransmitted packets. Also, reordering the ROB pointers by sequence number eliminates the need to continuously re-inspect the sequence number of each packet, thereby reducing network latency for the application.

Figure 4:
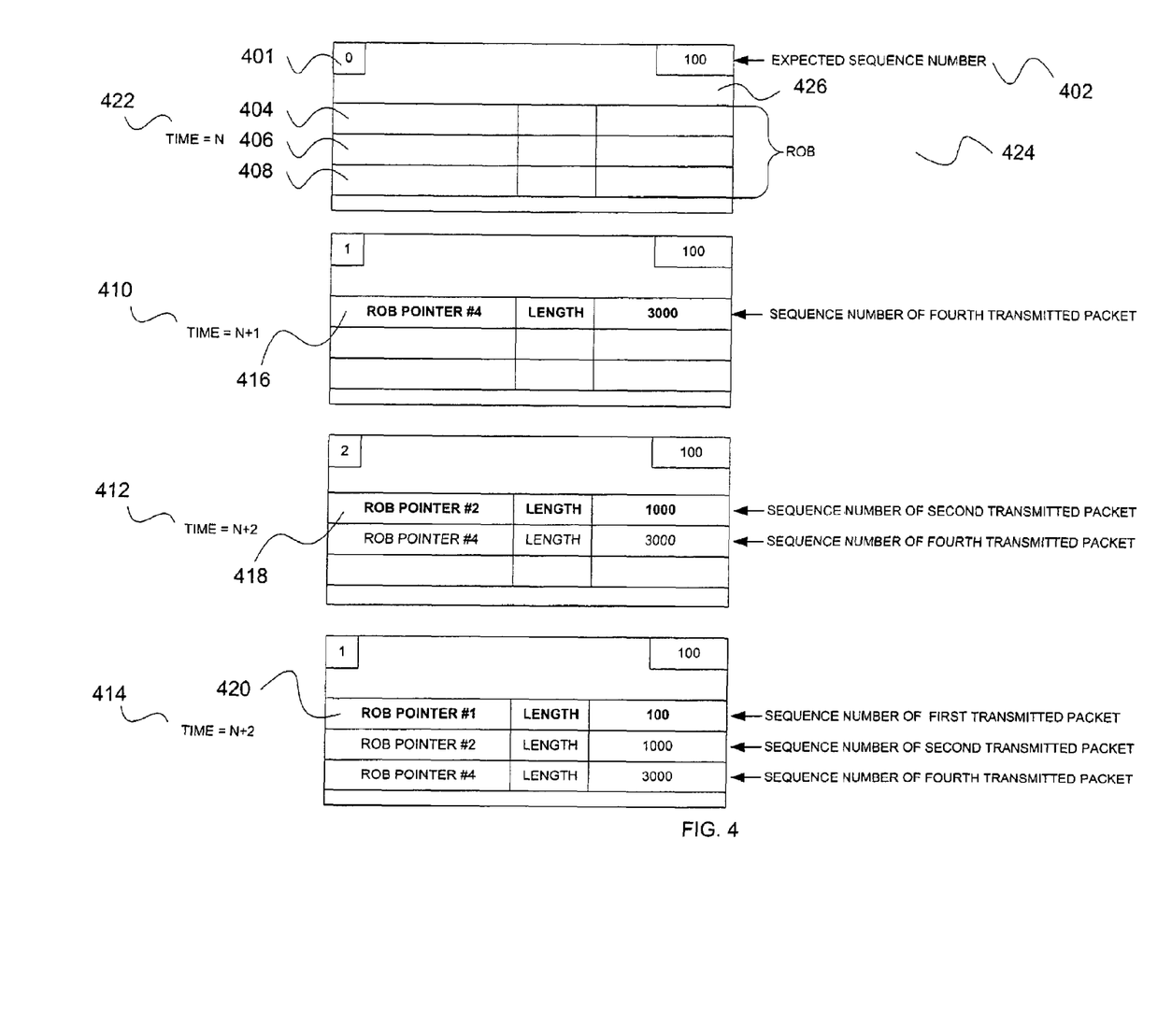
FIG. 4 illustrates, in accordance with another embodiment of the present invention, a simplified diagram showing an exemplary Rx TCB that includes the partial reordering feature for out-of-order packets.

FIG. 4 illustrates, in accordance with another embodiment of the present invention, a simplified diagram showing an exemplary Rx TCB that includes the partial reordering feature for out-of-order packets. In the embodiment of FIG. 4, packets that are sequentially contiguous with the packet having the next expected sequence number are forwarded to the application in the target device, and packets that are not sequentially contiguous with those forwarded are kept in the buffer to be reordered with packets subsequently arrived. In the example of FIG. 4, the Rx TCB contains three slots in the ROB 424 for each of three ordered entries, a first entry 404, and second entry 406, and a third entry 408. Each entry comprises a pointer to the received packet stored in the ROB, the length of the packet, and the sequence number of the packet. As in the FIG. 3, the TCB also contains a counter 401 that keeps track of the number of out-of-order packets that have arrived at the target device.

In this example, there are four packets to be transmitted from the source device to the target device. The first transmitted packet has a sequence number of 100, the second transmitted packet has a sequence number of 1000, and the third transmitted packet has a sequence number of 2000, and the fourth transmitted packet has a sequence number of 3000.

The packets arrive, however, out of order. The first packet received is the fourth transmitted packet with a sequence number of 3000. The second packet received is still the second transmitted packet with a sequence number of 1000.

And the third packet received is the first transmitted packet with a sequence number of 100. The third transmitted packet has not arrived.

Initially, at time=N (422), prior to any packets arriving, the ROB 424 is empty. The expected sequence number 402 is 100 which is also the sequence number of the first packet to be sent from the source device, since the TCP/IP data transfer has not yet started.

At time=N+1 (410), the fourth transmitted packet arrives with sequence number 3000. Since this does not match the expected sequence number 100, the fourth transmitted packet is placed memory, and a ROB pointer 416 is stored in the memory buffer 424 at the first entry 404, along with its length and sequence number. The out-of-order counter 401 is changed to "1". That is, there is one entry, and it is not in proper order.

At time=N+2 (412), the second transmitted packet has arrived with sequence number 1000. Since this also does not match the expected sequence number 100, the second transmitted packet is placed memory, and a ROB pointer 418 is stored in the memory buffer 424, along with its length and the sequence number. Since the second transmitted packet has a sequence number smaller than the previously arrived fourth transmitted packet, the ROB pointer to the second transmitted packet is placed in the first entry 404, and the ROB pointer to the fourth transmitted packet is moved to the second entry 406. The out-of-order counter 401 is changed to "2", since there are two entries, and both are out of order.

At time=N+4 (414), the first transmitted packet finally arrives, with a sequence number that matches the expected sequence number 402. At this point, the TCB places the first transmitted packet in memory, stores a ROB pointer 420 in the ROB 424 at the first entry 406, along with its length and the sequence number. The ROB pointer to the second transmitted packet is moved to the second entry 406, and the ROB pointer to the fourth transmitted packet is moved to the third entry 408. The out-of-order counter 401 is now changed back to "1", since there are three total entries, the first two are in proper order, but the last one is out-of-order.

The TCB then forwards the first two properly ordered entries, the first & second transmitted packets, by sequence number to the application on the target device. It then moves ROB pointer to the fourth transmitted packet to the first entry 404. And the TCB subsequently determines the next expected sequence number 402.

In the context of the present invention, partially reordering the ROB pointers, and forwarding the group of packets by sequence number to the application without continuous re-inspection, reduces network latency for the application, as in the prior art shown in FIG. 2

Figure 5:
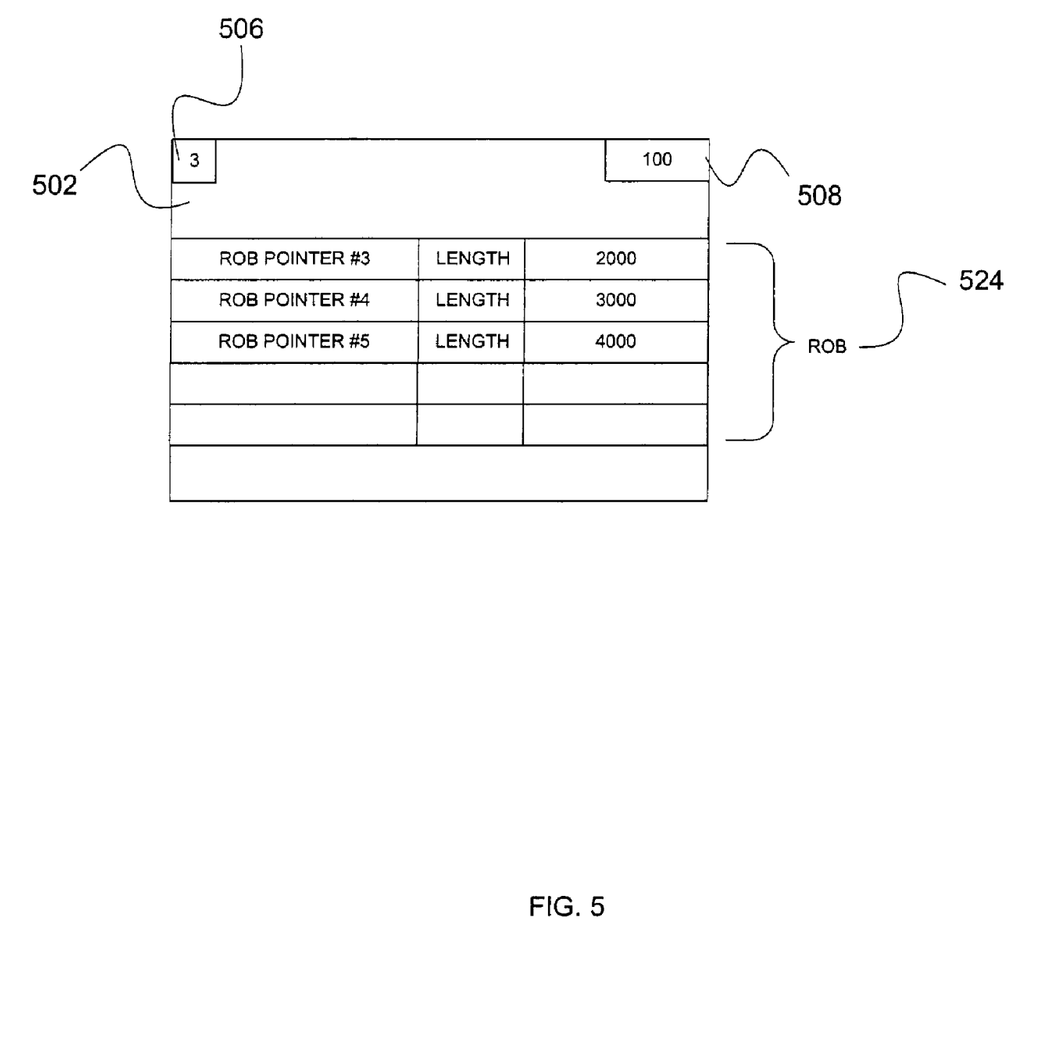
FIG. 5 illustrates, in accordance with another aspect of the present invention, a simplified diagram illustrating the look-ahead feature with regard to the partial reordering of out-of-order packets in a Rx TCB.

FIG. 5 illustrates, in accordance with another aspect of the present invention, a simplified diagram showing the look-ahead algorithm with regard to the partial reordering of out-of-order packets in a TCB 502. The TCB displays a ROB 524 that can hold a total of five ROB pointer entries.

The source device has sent six packets, with sequence numbers of 100, 1000, 2000, 3000, 4000, and 5000 respectively. The target device has received just three of the packets, with sequence numbers 2000, 3000, and 4000 respectively. The corresponding ROB pointers are stored by sequence number in the ROB 524.

The TCB look-ahead algorithm predicts, based on the lengths and sequence numbers of the already arrived packets, the next expected sequence number 508, and/or the maximum transport unit (MTU) the number of packets that have not arrived and allocate space therefor in the buffer. The MTU is typically determined during, for example, the initialization process (e.g., during discovery). Suppose, for example, that the MTU is 1,500 bytes. In this case, the look-ahead algorithm would predict that at least two packets will be required to transport the first 1,900 bytes (i.e., the smallest received sequence number of 2000 minus the expected sequence number of 100).

Accordingly, the look-ahead algorithm allocate the next two entries in the ROB for the expected two packets. Any packet arriving whose sequence number is not between the smallest received sequence number of 2,000 and the expected sequence number of 100 is simply discarded. For example, if the packet with sequence number 5,000 arrives next, it will be discarded because the remaining two entries have already been allocated. On the other hand, if the packet with the expected sequence number 100 or a packet with a sequence number 1,000 arrives next, that packet will be put into the ROB and be taken into consideration during re-ordering.

In the context of the present invention, the TCB look-ahead algorithm reduces the unnecessary reordering of ROB pointers. If the TCB believes that that a packet with a higher sequence number needs to be discarded in the future to make room for other expected packets, it will discard that packet upon its arrival at the target device. This thereby reduces the overall network latency for the application, as groups of correctly ordered packets can be forwarded to the application efficiently by reducing the amount of reordering steps that need to occur.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a target device, a method for partially reordering a plurality of data packets transmitted from a source device, said source device being coupled to said target device via a computer network, comprising:

receiving a first set of data packets from said transmitted device;

ascertaining whether said first set of data packets represents a set of data packets that said target device expects to receive next; and if said first set of data packets does not represents said set of data packets in an expected sequence number that said target expects to receive next, storing said first set of data packets in a memory buffer of said target device, said storing including arranging said first set of data packets in said memory buffer such that data packets in said memory buffer, including said first set of data packets, are in order in said memory buffer, wherein each packet of said plurality of data packets is associated with a sequence number, said sequence number determining a spatial relationship of said each packet relative to other packets in said plurality of data packets, said memory buffer is comprised of a plurality of storage structures for storing data packets of said plurality of data packets by their sequence numbers, and said each storage structure of said plurality of storage structures is configured to store a pointer to a memory location different from said memory buffer, said memory location being employed to store at least part of a packet received by said target device.

2. The method of claim 1, including allocating in advance at least one storage structure of said plurality of storage structures for storing a given data packet, said given data packet represents a data packet that said target device expects to receive next from said source device.

3. The method of claim 2 wherein a data packet received at said target device after said allocating is discarded if said data packet received at said target device after said allocating does not represent said data packet that said target device expects to receive next from said source device.

4. The method of claim 1, including allocating in advance, using a look-ahead algorithm, a set of storage structures of said plurality of storage structures for storing a given plurality of data packets, said given plurality of data packets represents data packets that said target device expects to receive next from said source device.

5. The method of claim 3 wherein data packets received at said target device after said allocating are discarded if said data packets received at said target device after said allocating do not represent said data packets that said target device expects to receive next from said source device.

6. A target device for partially reordering a plurality of data packets transmitted from a source device, said source device being coupled to said target device via a computer network, comprising:
   means for receiving a first set of data packets from said transmitted device;
   means for ascertaining whether said first set of data packets represents a set of data packets that said target device expects to receive next; and
   if said first set of data packets does not represents said set of data packets in an expected sequence number that said target expects to receive next, means for storing said first set of data packets in a memory buffer of said target device, said storing including arranging said first set of data packets in said memory buffer such that data packets in said memory buffer, including said first set of data packets, are in order in said memory buffer, wherein each packet of said plurality of data packets is associated with a sequence number, said sequence number determining a spatial relation ship of said each packet relative to other packets in said plurality of data packets, said memory buffer is comprised of a plurality of storage structures for storing data packets of said plurality of data packets by their sequence numbers, and said each storage structure of said plurality of storage structures is configured to store a pointer a memory location different from said memory buffer, said memory location being employed to store at least part of a packet received by said target device.

7. The target device of claim 6, including allocating in advance at least one storage structure of said plurality of storage structures for storing a given data packet, said given data packet represents a data packet that said target device expects to receive next from said source device.

8. The target device of claim 7, wherein a data packet received at said target device after said allocating is discarded if said data packet received at said target device after said allocating does not represent said data packet that said target device expects to receive next from said source device.

9. The target device of claim 6, including allocating in advance, using a look-ahead algorithm, a set of storage structures of said plurality of storage structures for storing a given plurality of data packets, said given plurality of data packets represents data packets that said target device expects to receive next from said source device.

10. The target device of claim 8, wherein data packets received at said target device after said allocating are discarded if said data packets received at said target device after said allocating do not represent said data packets that said target device expects to receive next from said source device.

* * * * *